US006269635B1

(12) United States Patent
Zuehlke

(10) Patent No.: US 6,269,635 B1
(45) Date of Patent: Aug. 7, 2001

(54) CONTROL AND HYDRAULIC SYSTEM FOR A LIFTCRANE

(75) Inventor: Arthur G. Zuehlke, Manitowoc, WI (US)

(73) Assignee: Manitowoc Crane Group, Inc., Reno, NV (US)

( * ) Notice: Subject to any disclaimer, the term of this patent is extended or adjusted under 35 U.S.C. 154(b) by 0 days.

(21) Appl. No.: 09/233,927

(22) Filed: Jan. 20, 1999

(51) Int. Cl.[7] ........................ F16D 39/00

(52) U.S. Cl. ........................ 60/368; 60/448; 60/452; 60/449

(58) Field of Search ........................ 60/368, 436, 442, 60/448, 449, 452, 911

(56) References Cited

U.S. PATENT DOCUMENTS

| | | | |
|---|---|---|---|
| 4,606,313 | 8/1986 | Izumi et al. | 123/386 |
| 5,189,605 | 2/1993 | Zuehike et al. | 364/140 |
| 5,297,019 | 3/1994 | Zuehike | 364/140 |
| 5,447,027 * | 9/1995 | Ishikawa et al. | 60/420 |
| 5,887,735 | 3/1999 | Abel | 212/277 |
| 6,079,576 * | 1/2000 | Bosler et al. | 212/278 |
| 6,131,391 * | 10/2000 | Poorman | 60/448 |

FOREIGN PATENT DOCUMENTS

| | | |
|---|---|---|
| 3323694 A1 | 1/1985 | (DE) . |
| 0 301 096 A1 | 8/1987 | (EP) . |
| 0 779 239 A1 | 11/1996 | (EP) . |
| 0 849 213 A1 | 10/1997 | (EP) . |
| 55-035785 | 3/1980 | (JP) . |
| 56-160458 | 12/1981 | (JP) . |
| 58-041126 | 3/1983 | (JP) . |
| 58-062228 | 4/1983 | (JP) . |
| 60-125455 | 7/1985 | (JP) . |
| 61-55093 | 3/1986 | (JP) . |
| 61-151339 | 7/1986 | (JP) . |
| 63-31995 | 2/1988 | (JP) . |
| WO 88/05937 | 11/1988 | (WO) . |

OTHER PUBLICATIONS

N. Ruckgauer, "Hydraulic Drives in Crane Construction", in Olhydraulik und pneumatik, pp. 150–163 (1986).

Dip. Lng Gotthard Drieschei, "Computer–Hydraulik am Bau" in Mikroprozessor in Hydraulikbaggern, pp. 21 & 22, (Jun. 1988).

Dipl.–ing U. Melcinger, Prof. Dr.–ing. W. Poppy "Eletronisch geregeltes Drei–Pumpen–System", (1988) pp. 549–533.

Dr.–ing. P. Wusthof, Lohr/Main "Verbesserte Energieausnutzung in der Mobilhydraulik", pp. 637–643, (1986).

Dr.–ing. H. Hesse, "Elektronik in der Mobilhydraulik" (1988) pp. 537–548.

Liebherr "Diesel–Hydraulic Floating Crane" Betriebsanleitung Instruction manual Manual d'instuction 1st Edition: 24th of Sep. 1986/wa; pp. 3–352.

"650 Ton Crawler Crane for Japan" in Allgemeine Bauzeitung, 2 pages.

"650–t–Raupenkran für Japan" in Fahrzeugkrane, dht12/85–[438]33, pp. 3–5.

"650–t–Raupenkran für Japan" in Firmen, pp. 1–3.

Betriebsanleitung Operating Instructions, Liebherr, 89 pages.

* cited by examiner

*Primary Examiner*—Edward K. Look
*Assistant Examiner*—Thomas E. Lazo
(74) *Attorney, Agent, or Firm*—Brinks Hofer Gilson & Lione

(57) ABSTRACT

A control system for a liftcrane that utilizes a closed loop hydraulic system that utilizes feed back and feed forward control architecture to provide responsiveness normally associated with systems that do not require feedback.

18 Claims, 2 Drawing Sheets

CONTROL AND HYDRAULIC SYSTEM FOR A LIFTCRANE

FIELD OF THE INVENTION

This invention relates to liftcranes and more particularly to an improved control and hydraulic system for a liftcrane.

BACKGROUND OF THE INVENTION

A liftcrane is a type of heavy construction equipment characterized by an upward extending boom from which loads can be carried or otherwise handled by retractable cables.

The boom is attached to the upper works of the liftcrane. The upper works are usually rotatable upon the lower works of the liftcrane. If the liftcrane is mobile, the lower works may include a pair of crawlers (also referred to as tracks). The boom is raised or lowered by means of a cable(s) or cylinder(s) and the upper works also include a drum upon which the boom cable can be wound. Another drum (referred to as a hoist drum) is provided for cabling used to raise and lower a load from the boom. A second hoist drum (also referred to as the whip hoist drum) is usually included rearward from the first hoist drum. The whip hoist is used independently or in association with the first hoist. Different types of attachments for the cabling are used for lifting, clamshell, dragline and so on. Each of these combinations of drums, cables and attachments, such as the boom or clam shell are considered herein to be mechanical subsystems of the liftcrane. Additional mechanical subsystems may be included for operation of a gantry, the tracks, counterweights, stabilization, counterbalancing and swing (rotation of the upper works with respect to the lower works). Mechanical subsystems in addition to these may also be provided.

As part of the upper works, a cab is provided from which an operator can control the liftcrane. Numerous controls such as levers, handles, knobs, and switches are provided in the operator's cab by which the various mechanical subsystems of the liftcrane can be controlled. Use of the liftcrane requires a high level of skill and concentration on the part of the operator who must be able to simultaneously manipulate and coordinate the various mechanical systems to perform routine operations.

The two most common types of power systems for liftcranes are friction-clutch and hydraulic. In the former type, the various mechanical subsystems of the liftcrane connect by means of clutches that frictionally engage a drive shaft driven by the liftcrane engine. The friction-clutch liftcrane design is considered generally older than the hydraulic type of liftcrane design.

In hydraulic systems, an engine powers a hydraulic pump that in turn drives an actuator (such as a motor or cylinder) associated with each of the specific mechanical subsystems. Hoists actuated by hydraulic motors use brakes for parking. Cylinder actuated hoists use load holding valves as their parking mechanism. The actuators translate hydraulic pressure forces to mechanical forces thereby imparting movement to the mechanical subsystems of the liftcrane.

Hydraulic systems used on construction machinery may be divided into two types—open loop and closed loop. Most hydraulic liftcranes use primarily an open loop hydraulic system. In an open loop system, hydraulic fluid is pumped (under high pressure provided by the pump) to the actuator. After the hydraulic fluid is used in the actuator, it flows back (under low pressure) to a reservoir before it is recycled by the pump. The loop is considered "open" because the reservoir intervenes on the fluid return path from the actuator before it is recycled by the pump. Open loop systems control actuator speed by means of valves. Typically, the operator adjusts a valve to a setting to allow a portion of flow to the actuator, thereby controlling the actuator speed. The valve can be adjusted to supply flow to either side of the actuator thereby reversing actuator direction.

By contrast, in a closed loop system, return flow from an actuator goes directly back to the pump, i.e., the loop is considered "closed." Closed loop systems control speed and direction by changing the pump output.

Open loop systems have been generally favored over closed loop systems because of several factors. In an open loop system, a single pump can be made to power relatively independent, multiple mechanical subsystems by using valves to meter the available pump flow to the actuators. Also, cylinders, and other devices which store fluid, are easily operated since the pump does not rely directly on return flow for source fluid. Because a single pump usually operates several mechanical subsystems, it is easy to bring a large percentage of the liftcrane's pumping capability to bear on a single mechanical subsystem. Auxiliary mechanical subsystems can be easily added to the system.

However, open loop systems have serious shortcomings compared to closed loop systems, the most significant of which is a lack of efficiency. A liftcrane is often required to operate with one mechanical subsystem fully loaded and another mechanical subsystem unloaded yet with both turning at full speed, e.g., in operations such as clamshell, grapple, and level-luffing. An open loop system having a single pump must maintain pressure sufficient to drive the fully loaded mechanical subsystem. Consequently, flow to the unloaded mechanical subsystems wastes an amount of energy equal to the unloaded flow multiplied by the unrequired pressure.

Open loop systems also waste energy across the valves needed for acceptable operation. For example, the main control valves in a typical load sensing, open loop system (the most efficient type of open loop system for a liftcrane) dissipates energy equal to 300–400 PSI times the load flow. Counterbalance valves required for load holding typically waste energy equal to 500–2,000 PSI times the load flow.

As a result of the differences in efficiency noted above, a single pump open loop system requires considerably more horsepower to do the same work as a closed loop system. This additional horsepower could easily consume thousands of gallons of fuel annually. Moreover, all this wasted energy converts to heat. It is no surprise, therefore, that open loop systems require larger oil coolers than comparable closed loop systems.

Controllability can be another problem for open loop circuits. Since all the main control valves are presented with the same system pressure, the functions they control are subject to some degree of load interference, i.e., changes in pressure may cause unintended changes in actuator speed. Generally, open loop control valves are pressure compensated to minimize load interference. But none of these devices are perfect and speed changes of 25% with swings in system pressure are not atypical. This degree of speed change is disruptive to liftcrane operation and potentially dangerous.

To avoid having to use an extremely large pump, many open loop systems have devices which limit flow demand when multiple mechanical subsystems are engaged. Such devices, along with the required load sensing circuits and counterbalance valves mentioned above, are prone to instability. It can be very difficult to adjust these devices to work properly under all the varied operating conditions of a liftcrane.

An approach taken by some liftcranes manufactures with open loop systems to minimize the aforementioned problems is to use multi-pump open loop systems. This approach surrenders the main advantage that the open loop has over closed loop, i.e., the ability to power many functions with a single pump.

In summary, although most presently available liftcranes generally use open loop hydraulic systems, these are very inefficient and this inefficiency costs the manufacturers by requiring large engines and oil coolers and it costs the user in the form of high fuel bills. Moreover, another disadvantage is that open loop systems in general can have poor controllability under some operating conditions.

It is thus desirable to provide a closed loop system to overcome the disadvantages associated with open loop systems. Closed loop systems however, are not inherently suited for control of liftcrane hoists or raising devices or subsystems. The energy from a weight being lowered must be absorbed somehow by the hoist. On hydraulic machines, this is typically done with load holding valves which dissipate the energy to heat. Since the oil flow in closed loop systems does not return to a reservoir, it is very difficult to remove this heat from the oil. Consequently, load holding valves are not practical for use in closed loop systems.

Without holding valves, the control logic which must be used for a closed loop winch is considerably more complicated than what is typically used for the open loop equivalent. Because of this, the control scheme for a closed loop liftcrane hoist is best implemented in software running on a programmable controller.

Basic to this hoist control method is the use of feedback from pressure and motion sensors to maintain the proper direction and speed of the hoist. While such an approach generally produces very accurate and smooth hoist control, it is difficult to match the responsiveness of systems that don't use feedback.

It is therefore desirable to provide a hoist control system that: 1) allows use of the closed loop hydraulic system, 2) produces smooth and accurate control characteristics typical of feedback architectures, and 3) provides the responsiveness normally associated with systems that do not require feedback.

SUMMARY OF THE INVENTION

The present invention provides an improved control system for liftcrane hoists and raising devices or subsystems. The liftcrane hoist is a mechanical subsystem of the liftcrane powered by an engine-driven closed loop hydraulic system. This subsystem includes sensors to communicate operator commands, pump speed, pump pressure and hoist actuator motion status to the controller as well as output devices which allow the controller to manipulate the hoist pump and brake mechanism. The controller is capable of running a routine for control of the liftcrane hoist subsystem.

The present invention achieves the goals of using a closed loop hydraulic system, providing smooth and accurate control characteristics typical of feedback architectures, and providing the responsiveness normally associated with systems that do not require feedback.

The control method of the present invention accomplishes these goals by predetermining, through test, adaptive control techniques and application of theory, the controller output commands required to satisfy the operator's motion commands. The role of feedback is thereby minimized and smooth, accurate and responsive control is attained.

DETAILED DESCRIPTION OF THE PRESENTLY PREFERRED EMBODIMENTS

Figure 1:
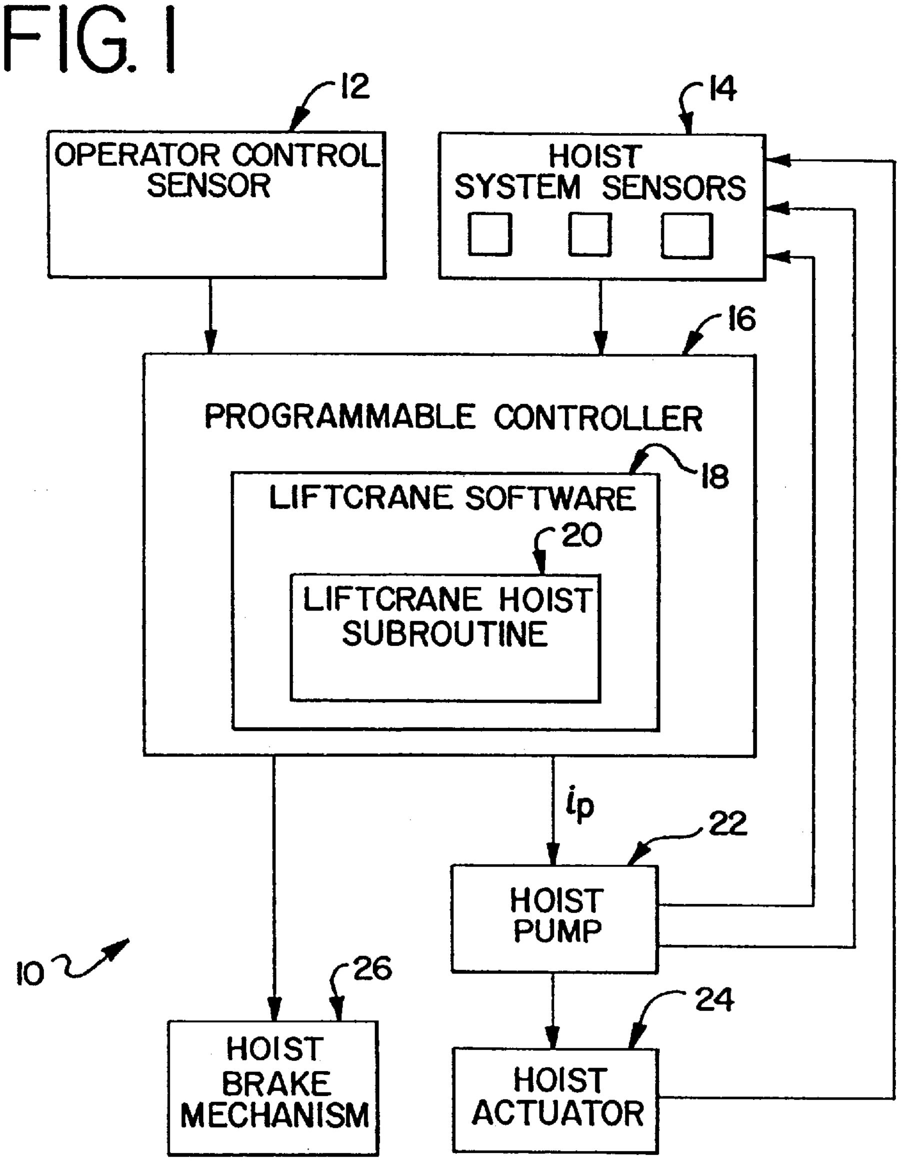
FIG. 1 is a block diagram of the liftcrane hoist subsystem according to a preferred embodiment of the present invention.

FIG. 1 is a block diagram of the liftcrane hoist subsystem according to a preferred embodiment of the present invention. The hoist subsystem 10 includes an operator control sensor 12, hoist system sensors 14, a controller 16 and more preferably a programmable controller 16, a hoist pump 22, a hoist actuator 24 and hoist brake mechanism 26. The programmable controller 16 receives inputs from the operator control sensor 12 and hoist system sensors 14. The programmable controller 16 outputs signals to the hoist brake mechanism 26 and hoist pump 22. The hoist pump 22 outputs signals to the hoist actuator 24 and hoist system sensors 14. The programmable controller 16 preferably has liftcrane software 18 to control the operation of the liftcrane. The liftcrane software 18 includes a liftcrane hoist subroutine 20 which is part of the present invention. In a preferred embodiment the programmable controller is the Manitowoc Cranes, Co. #366105 manufactured for Manitowoc by Eder Corporation. Of course other processors may be used.

Figure 2:
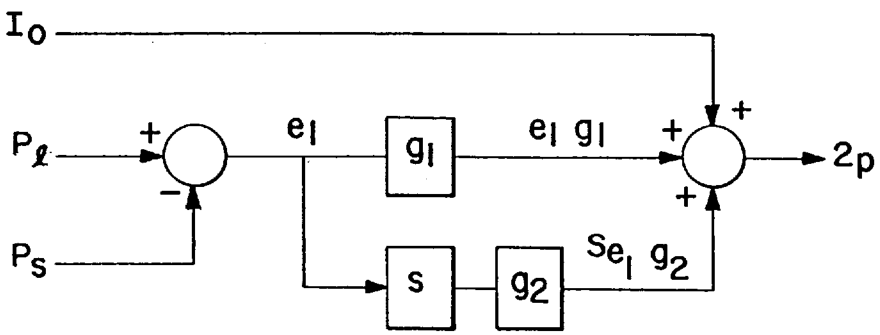
FIG. 2 is a control diagram of the pressure mode.

The invention is best described by reference to the liftcrane hoist subroutine 20 and the control diagrams illustrated in FIGS. 2 and 3.

The software to be described below has been simplified to better focus on the invention. The code shown is sufficient to allow anyone skilled in the art to reproduce this invention. The code has been simplified by removing all references to other crane functions (swing, tracks, etc.) which are not a part of the present invention. The logic required to fetch, scale and bracket sensor data, to output voltage signals to the various output devices, to increment system timers and to hold variables within reasonable limits has also been removed. All system and variable initialization is assumed and therefore removed.

The program units used in the software are as follows:

| | |
|---|---|
| speed | RPM |
| pressure | PSI |
| operator command | % |
| pump command | % |
| time | SEC |

Table 1 below cross references the control terms shown in FIGS. 2 and 3 with the program terms described below.

TABLE 1

| CONTROL TERM | PROGRAM TERMS |
|---|---|
| $I_0$ | threshold |
| $I_1K_0$ | table_pump_command |
| $N_a$ | actuator speed |
| $N_p$ | pump drive speed |
| h | operator_command |
| $P_s$ | HOIST_PRESSURE |
| $P_l$ | LOAD_PRESSURE |
| $I_0 + I_1K_0$ | base_command |
| $K_0$ | leakage_constant |
| $i_p$ | pump_command |
| $N_c$ | speed_target |
| $N_a$ | HOIST_SPEED |
| $I_{ff}$ | feed_forward_term |

First, a "threshold" value must be determined for each hoist system. The "threshold" is a constant which is the hoist pump command required to initiate flow from the pump. It must be determined by test on each hoist system. A typical procedure for this could be as follows:

A. Set engine at hi idle (max pump drive speed)

B. Command the pump to achieve a 100 PSI pressure rise over no-load conditions.

C. Store the resulting pump command as the "threshold" value.

In a particular example the threshold value was determined to be 12.5. This is represented in line 1 of the code below.

Figure 3:
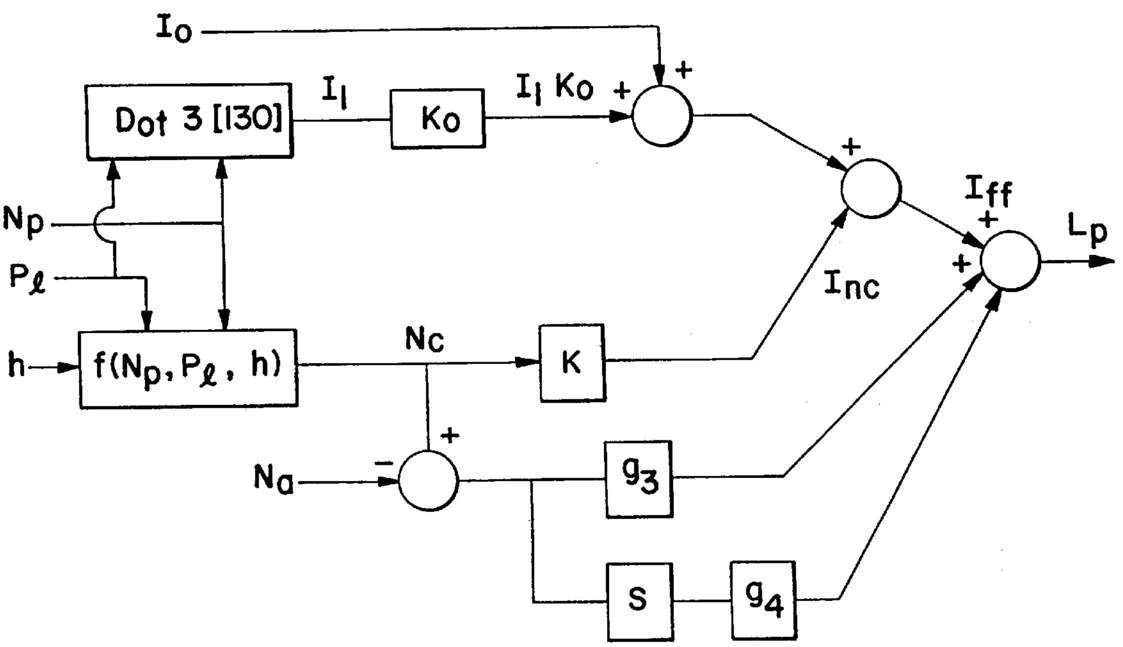
FIG. 3 is a control diagram of the motion mode.

1 threshold=12.5;

Program lines 2 through 16 represent a predetermined data table, dat3[130] shown in FIG. 3. The values in table dat3[130] gives the differential pump command (command greater than threshold) with respect to hoist pressure under the following conditions:

A. 0 hoist actuator speed

B. 1400 RPM pump drive speed

C. fixed system leakage characteristics.

The 130 members of dat3[ ] cover a hoist pressure range from 0 to 4800 PSI in 36 psi increments. A hoist pressure range is the pressure generated by the lift of a load. 4800 psi is the peak rated hoist pressure for a particular hoist. Of course depending on the hoist, a different pressure range can be specified.

Table dat3[ ] is used in the subroutine hoist( ) to be described below to give the pump command required to produce 0 hoist actuator speed given the hoist pressure and the pump drive speed.

The values from dat3[ ] are modified within the subroutine hoist( ) to account for different pump drive speeds and varying system leakage conditions.

Table dat3[ ] can be developed by test or through application of theory. Alternately, a mathematical expression could be developed to approximate this table.

```
2    const unsigned int dat3[130] = {
3    0.0, 0.0, 0.0, 0.0, 0.0, 0.0, 0.0, 0.0, 0.0, 0.0,
4    0.8, 1.6, 2.4, 3.2, 4.0, 4.8, 5.6, 6.2, 6.9, 7.4,
5    7.9, 8.4, 8.5, 9.1, 9.4, 9.7, 10.0, 10.2, 10.4, 10.6,
6    10.8, 10.9, 11.1, 11.2, 11.4, 11.5, 11.6, 11.7, 11.8, 11.9,
7    12.1, 12.2, 12.3, 12.4, 12.5, 12.6, 12.7, 12.8, 13.0, 13.1,
8    13.2, 13.3, 13.4, 13.6, 13.7, 13.8, 13.9, 14.1, 14.2, 14.3,
9    14.5, 14.6, 14.7, 14.8, 14.9, 15.1, 15.2, 15.3, 15.4, 15.5,
10   15.6, 15.7, 15.8, 15.9, 16.0, 16.1, 16.2, 16.3, 16.4, 16.5,
```

-continued

```
11   16.6, 16.6, 16.7, 16.8, 16.9, 17.0, 17.0, 17.1, 17.2, 17.3,
12   17.3, 17.4, 17.5, 17.6, 17.7, 17.7, 17.8, 17.9, 18.0, 18.0,
13   18.1, 18.2, 18.3, 18.4, 18.4, 18.5, 18.6, 18.6, 18.7, 18.7,
14   18.7, 18.7, 18.8, 18.8, 18.8, 18.8, 18.9, 18.9, 18.9, 18.9,
15   19.0, 19.0, 19.0, 19.0, 19.1, 19.1, 19.1, 19.1, 19.2, 19.2,
16   };
```

Lines 17 through 20 are the main loop of the program. In a typical liftcrane program, the software for a particular hoist is called and executed once during each loop.

```
17 main()
18 {
19       while (1) hoist();
20 }
```

Lines 21 through 89 are the primary hoist routine called from within the main( ) while(1) loop above.

21 void hoist( )

22 {

In order to know the hoist pressure level required to balance the suspended hoist load when the brake mechanism is released, the system stores the hoist pressure encountered just prior to the last application of the brake mechanism in the variable LOAD_PRESSURE on line 23.

23 if (brake is RELEASED) LOAD_PRESSURE= HOIST_PRESSURE;

The variable operator_command is the state of the operator control sensor 12 shown in FIG. 1. Operator_command is scaled from 0 to +/−100%. An operator_command greater than 0% is a "raise" command. An operator_command less than <0% is a "lower" command. operator_command =0% is a neutral or "stop" command. If an operational limit or a system failure is detected that requires the hoist to be disabled, line 24 will set operator_command to 0%.

24 if (hoist_fault is ON) operator_command=0;

Lines 25–30 set the brake output command to be sent to the brake mechanism 26 shown in FIG. 1. Positive hoist speed is in the hoist "raise" direction. With a closed loop hydraulic system, hoist pressure is always on "raise" side of the circuit and consequently always has a "positive" sense. In line 25 it is determined whether the operator of the liftcrane has issued a raise or lower command by using the operator control sensor 12. In line 27, if the hoist pressure ($P_s$) is equal to or greater than the load pressure ($P_l$) which is the hoist pressure encountered just prior to the last application of the brake mechanism as determined at line 23, then the brake output command is to release the brake.

```
25         if (operator_command is_not 0)
26         {
27                if (HOIST_PRESSURE >= LOAD_PRESSURE) brake
= RELEASED;
```

Because some hoists have bidirectional brakes and others have brakes that hold only in the lowering position, in the latter case it is possible when a machine is commissioned, to have LOAD_PRESSURE higher than it actually is. If there is no provision to release the brake from the speed sensor, the winch might turn forever trying to get HOIST_PRESSURE to be equal to LOAD_PRESSURE. Line 28 provides for such a situation.

```
28     if (HOIST_SPEED > 0.20)
brake = RELEASED;
29   }
```

In line 30, a handle neutral timer keeps track of how long the operator_command has been 0.

30 if (handle_neutral_timer >0.80) brake=APPLIED;

The hoist pump control logic has 3 primary "modes" of operation—PRESSURE, MOTION and NEUTRAL. Lines 31 through 35 set the mode that is appropriate to the system conditions. The variable "last_mode" is used below to initiate actions that must occur at the moment a mode is changed.

```
31        last_mode = mode;
32        if (mode is PRESSURE and brake is RELEASED)
   mode = MOTION;
33        if (mode is NEUTRAL and operator_command is_not 0)
   mode = PRESSURE;
34        if (mode is PRESSURE and operator_command is 0)
   mode = NEUTRAL;
35        if (mode is MOTION and brake is APPLIED)
   mode = NEUTRAL;
```

Lines 37 through 41 set the pump base command (base_command). The base command is the hoist pump output command required to hold a given load motionless. The base command is calculated from the threshold, dat3ø, leakage_constant and pump drive speed. As previously mentioned, the threshold is a constant determined by a system test performed when a machine is commissioned and defines the pump command required to initiate flow from the pump. The leakage_constant is an adaptive term that modifies the data from dat3ø to account for changing system leakage conditions.

```
37        table_pump_command = dat3[
FILTERED_LOAD_PRESSURE/36];
38        table_pump_command = (table_pump_command * 1400)/
          PUMP_DRIVE_SPEED;
39        if (last_mode is PRESSURE and mode is MOTION)
          {
   leakage_constant = (pump_command − threshold)/
   table_pump_command;
          }
40        base_command = (table_pump_command *
          leakage_constant) + threshold;
```

Lines 41 through 89 define the pump output command for the three primary modes of operation discussed above. Lines 41–55 describe the pressure mode. FIG. 2 illustrates the control diagram for the pressure mode. At line 47, errore1, shown in FIG. 2 is determined by subtracting hoist pressure from the load pressure.

```
41   switch (mode)
42   {
43        case PRESSURE:
44        {
45             if (last_mode is NEUTRAL) integral_term =
               pump_command;
46             if (integral_term < threshold) integral_term =
```

-continued

```
               threshold;
47             error = LOAD_PRESSURE -
               HOIST_PRESSURE;
48        integral_term + = error*0.038 (integral_term equals
          itself plus the quantity, error*0.038);
49             proportional_term = error*0.22;
50             pump_command = integral_term +
               proportional_term;
51             break;
52        }
```

Lines 53–71 describe the motion mode. FIG. 3 illustrates the control diagram for the motion mode. Lines 56–62 define block $f(N_p, P_l, h)$ shown in FIG. 3.

```
53        case MOTION:
54        {
55             if (last_mode is PRESSURE) integral_term =
               0;
56             Max_flow_speed = PUMP_DRIVE_SPEED *
               0.020;
57             Max_horsepower_speed = 60000/(100 +
               LOAD_PRESSURE);
58             Speed_target = least_Of(Max_flow_speed,
               Max_horspower_speed);
59             if (operator_command > 5.0)        command =
               operator_command - 5.0;
60        else if (operator_command < −5.0) command =
          operator_command + 5.0;
61          else                         command = 0;
62             Speed_target * = command/0.95;
63             error = speed_target − HOIST_SPEED;
64             integral_term += error * 0.12;
65             proportional_term = error * 0.50;
66             if (operator_command > 5.0)
feed_forward_term = 100 − base_command;
               else
feed_forward_term = 100 + base_command;
67             feed_forward_term *= speed_target/
Max_speed;
68             feed_forward_term += base_command;
69             pump_command = feed_forward_term +
integral_term + proportional_term;
70             break;
71        }
```

Figure 4:
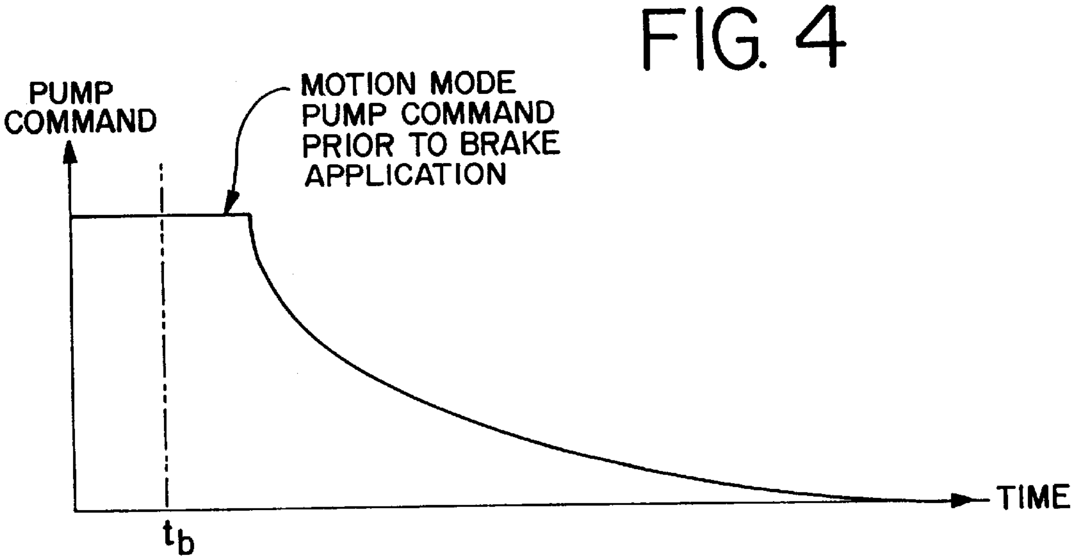
FIG. 4 is a graph illustrating the neutral mode.

Lines 72–89 describe the neutral mode. FIG. 4 is a graph of the pump command in the neutral mode.

```
72        case NEUTRAL:
73        {
74           if (neutral_time < 0.500)
75           {
76              error = -HOIST_SPEED;
77              integral_term += error*0.12;
78           proportional_term = error*0.50;
79           pump_command = base_command +
integral_term + proportional_term;
             }
80           else
81           {
82              integral_term = 0;
83           proportional_term = 0;
84           pump_command = pump_command - (
pump_command / 32);
85           }
86           break;
87        }
88     }
89   }
```

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A control system for a liftcrane, the control system comprising:

a hoist actuator powered by a hydraulic pump, said hoist actuator connected to said pump by a closed hydraulic loop;

a brake mechanism having an engaged state and a disengaged state;

hoist system sensors operable to detect pressure in said closed loop and speed of said hoist actuator and said pump, and output signals indicative thereof;

an operator control sensor operable to output signals representative of an operator command; and a programmable controller coupled to said brake mechanism, said hoist system sensors, said pump and said operator control sensor, said programmable controller adapted to run a routine operable to output signals to said pump and said brake mechanism for the operation thereof based upon the signals output by said hoist system sensors and said operator control sensor, wherein said routine includes a pressure mode operable to output a first pump control current signal $i_p$ to said pump when said brake mechanism is in its engaged state, the operator control sensor indicates that motion of the hoist is desired, and the detected system pressure is less than a load induced pressure, wherein said pump control current signal $i_p$ is determined by adding a threshold value $I_o$ to an error signal indicative of the difference between the detected system pressure and the load induced pressure.

2. A control system according to claim 1 wherein said routine further comprises a motion mode which operates exclusively of the pressure mode, wherein during said motion mode the program controller is operable to output a second pump control current signal $i_p$ to said hoist when said brake mechanism is in its disengaged state, wherein the operator control sensor indicates the desired motion of the hoist, and wherein said second pump control current signal $i_p$ is determined by adding a feed-forward value $I_{ff}$ to an error signal indicative of the difference between a command actuator speed value $N_c$ and an actual actuator speed value $N_a$.

3. A control system according to claim 2 wherein said feed-forward value $I_{ff}$ is calculated by adding the threshold value $I_o$, an incremental pump unit value $I_1K_0$ required to cover system leakage for a given load induced pressure and pump drive speed, and an incremental pump control current signal $I_{nc}$ required to produce commanded actuator speed.

4. A control system according to claim 3 wherein the incremental pump unit value $I_1K_0$ further comprises a value $I_1$ determined from a look-up table stored in a memory of the programmable controller and a leakage constant value $K_0$ determined during operation of the hoist.

5. In a liftcrane that includes a hoist powered by a closed loop hydraulic system and controls for outputting signals for operating the hoist, a control system comprising:

a programmable controller adapted to run a routine operable to output a pump control current signal $i_p$ to a pump in the closed loop hydraulic system for operation thereof wherein said routine comprises a pressure mode and a motion mode, wherein said pressure mode and said motion mode operate exclusively of each other, and wherein said pressure mode calculates a pump control current signal $i_p$ needed to build system pressure equal to a load induced pressure and said motion mode calculates a pump control current signal $i_p$ needed for a hoist actuator to reach a commanded speed, and wherein in the pressure mode said pump control current signal $i_p$ is determined by adding a threshold value $I_o$ to an error signal indicative of the difference between the detected system pressure and the load induced pressure.

6. A control system according to claim 5 wherein said routine further comprises a neutral mode which operates exclusively of the pressure and motion modes wherein said neutral mode decreases the pump control current signal $i_p$ to zero.

7. In a liftcrane that includes at least one hoist powered by a hoist actuator connected to a pump by a closed loop hydraulic system and controls for outputting signals for operating the hoist, a control system for operation of the hoist comprising:

a programmable controller responsive to the controls and coupled to the pump and a brake mechanism, the controller including a routine adapted to control the hoist actuator to define operation of the hoist;

sensors coupled to the controller for providing information about the status of the hoist to the controller wherein the sensors are capable of detecting pressure in the closed loop hydraulic system and speed of the hoist actuator and the pump;

and further in which the routine that the programmable controller is adapted to run is further characterized as a routine that includes a pressure mode adapted to monitor and enable operation of the hoist when an operator commands motion of the hoist and the brake mechanism is in an engaged state and the pressure of the closed loop hydraulic system does not equal a load induced pressure; and wherein in the pressure mode a pump control current signal $i_p$ is determined by adding a threshold value $I_o$ to an error signal indicative of the difference between the detected system pressure and the load induced pressure.

8. The control system of claim 7 in which the routine that the programmable controller is adapted to run is further characterized as a routine that includes:

a motion mode adapted to monitor and enable operation of the hoist when an operator commands motion of the hoist and the brake mechanism is in a disengaged state.

9. The control system of claim 7 in which the routine that the programmable controller is adapted to run is further characterized as a routine that includes:

a neutral mode adapted to monitor and enables operation of the hoist when an operator commands no motion.

10. A control system for a liftcrane, the control system comprising:

a hoist actuator powered by a hydraulic pump, said hoist actuator connected to said pump by a closed hydraulic loop;

a load holding device having an engaged state and a disengaged state;

hoist system sensors operable to detect pressure in said closed loop and speed of said hoist actuator and said pump, and output signals indicative thereof;

an operator control sensor operable to output signals representative of an operator command; and a programmable controller coupled to said load holding device, said hoist system sensors, said pump and said operator control sensor, said programmable controller adapted to run a routine operable to output signals to said pump and said load holding device for the operation thereof based upon the signals output by said hoist system sensors and said operator control sensor, wherein said routine includes a pressure mode operable to output a first pump control current signal $i_p$ to said pump when said load holding device is in its engaged state, the operator control sensor indicates that motion of the hoist is desired, and the detected system pressure is less than a load induced pressure, wherein said pump control current signal $i_p$ is determined by adding a threshold value $I_o$ to an error signal indicative of the difference between the detected system pressure and the load induced pressure.

11. A control system according to claim 10 wherein said routine further comprises a motion mode which operates exclusively of the pressure mode, wherein during said motion mode the program controller is operable to output a second pump control current signal $i_p$ to said hoist when said load holding device is in its disengaged state, wherein the operator control sensor indicates the desired motion of the hoist, and wherein said second pump control current signal $i_p$ is determined by adding a feed-forward value $I_{ff}$ to an error signal indicative of the difference between a command actuator speed value $N_c$ and an actual actuator speed value $N_a$.

12. A control system according to claim 11 wherein said feed-forward value $I_{ff}$ is calculated by adding the threshold value $I_o$, an incremental pump unit value $I_1K_0$ required to cover system leakage for a given load induced pressure and pump drive speed, and an incremental pump control current signal $I_{nc}$ required to produce commanded actuator speed.

13. A control system according to claim 12 wherein the incremental pump unit value $I_1K_0$ further comprises a value $I_1$ determined from a look-up table stored in a memory of the programmable controller and a leakage constant value $K_0$ determined during operation of the hoist.

14. In a liftcrane that includes at least one hoist powered by a hoist actuator connected to a pump by a closed loop hydraulic system and controls for outputting signals for operating the hoist, a control system for operation of the hoist comprising:

a programmable controller responsive to the controls and coupled to the pump and a load holding device, the controller including a routine adapted to control the hoist actuator to define operation of the hoist:

sensors coupled to the controller for providing information about the status of the hoist to the controller wherein the sensors are capable of detecting the pressure in the closed loop hydraulic system and speed of the hoist actuator and the pump; and further in which the routine that the programmable controller is adapted to run is further characterized as a routine that includes a pressure mode adapted to monitor and enable operation of the hoist when an operator commands motion of the hoist and said load holding device is in an engaged state and the pressure of the closed loop hydraulic system does not equal a load induced pressure; and wherein in the pressure mode a pump control current signal $i_p$ is determined by adding a threshold value $I_o$ to an error signal indicative of the difference between the detected system pressure and the load induced pressure.

15. The control system of claim 14 in which the routine that the programmable controller is adapted to run is further characterized as a routine that includes:

a motion mode adapted to monitor and enable operation of the hoist when an operator commands motion of the hoist and said load holding device is in a disengaged state.

16. The control system of claim 14 in which the routine that the programmable controller is adapted to run is further characterized as a routine that includes:

a neutral mode adapted to monitor and enable operation of the hoist when an operator commands no motion.

17. The control system of claim 14, wherein the load holding device is a brake mechanism.

18. The control system of claim 14, wherein the load holding device is a load holding valve.

* * * * *